(12) United States Patent　(10) Patent No.: US 8,968,903 B2
Deane et al.　(45) Date of Patent: *Mar. 3, 2015

(54) FLUID-SURFACED ELECTRODE

(75) Inventors: Geoffrey F. Deane, Bellevue, WA (US);
Bran Ferren, Beverly Hills, CA (US);
William Gates, Redmond, WA (US); W.
Daniel Hillis, Encino, CA (US);
Roderick A. Hyde, Redmond, WA (US);
Muriel Y. Ishikawa, Livermore, CA
(US); Edward K. Y. Jung, Bellevue, WA
(US); Jordin T. Kare, Seattle, WA (US);
Nathan P. Myhrvold, Medina, WA
(US); Clarence T. Tegreene, Bellevue,
WA (US); David B. Tuckerman,
Lafayette, CA (US); Thomas A.
Weaver, San Mateo, CA (US); Charles
Whitmer, North Bend, WA (US);
Lowell L. Wood, Jr., Bellevue, WA
(US); Victoria Y. H. Wood, Livermore,
CA (US)

(73) Assignee: The Invention Science Fund I, LLC,
Bellevue, WA (US)

( * ) Notice: Subject to any disclaimer, the term of this
patent is extended or adjusted under 35
U.S.C. 154(b) by 587 days.

This patent is subject to a terminal disclaimer.

(21) Appl. No.: 12/589,323

(22) Filed: Oct. 20, 2009

(65) Prior Publication Data

US 2011/0027627 A1　Feb. 3, 2011
US 2013/0130067 A2　May 23, 2013

Related U.S. Application Data

(63) Continuation-in-part of application No. 12/589,322,
filed on Oct. 20, 2009, and a continuation-in-part of (Continued)

(51) Int. Cl.
*H01M 2/38*　(2006.01)
*H01M 4/02*　(2006.01)
(Continued)

(52) U.S. Cl.
CPC　*H01M 4/02* (2013.01); *H01M 4/36* (2013.01);
*H01M 4/366* (2013.01); *H01M 10/44* (2013.01);
(Continued)

(58) Field of Classification Search
USPC ................... 429/105, 101–104, 51
See application file for complete search history.

(56) References Cited

U.S. PATENT DOCUMENTS 3,245,836 A　4/1966　Agruss
3,404,036 A　10/1968　Weber et al.
(Continued)

FOREIGN PATENT DOCUMENTS

CA　2727399 A1　12/2009
CN　1398438 A　2/2003
(Continued)

OTHER PUBLICATIONS

Lahann et al.; "A Reversibly Switching Surface"; Science; Bearing a date of Jan. 17, 2003; pp. 371-374; vol. 299.
(Continued)

*Primary Examiner* — Ula C. Ruddock
*Assistant Examiner* — Osei Amponsah
(74) *Attorney, Agent, or Firm* — Foley & Lardner LLP

(57) ABSTRACT

An electrochemical device (such as a battery) includes at least one electrode having a fluid surface, which may employ a surface energy effect to maintain a position of the fluid surface and/or to modulate flow within the fluid. Fluid-directing structures may also modulate flow or retain fluid in a predetermined pattern. An electrolyte within the device may also include an ion-transport fluid, for example infiltrated into a porous solid support.

33 Claims, 2 Drawing Sheets

Related U.S. Application Data application No. 12/589,310, filed on Oct. 20, 2009, and a continuation-in-part of application No. 12/589,309, filed on Oct. 20, 2009, and a continuation-in-part of application No. 12/462,205, filed on Jul. 29, 2009, now Pat. No. 8,460,814.

(51) Int. Cl.
| | | |
|---|---|---|
| *H01M 4/36* | (2006.01) | |
| *H01M 10/44* | (2006.01) | |
| *H01M 10/613* | (2014.01) | |
| *H01M 10/617* | (2014.01) | |
| *H01M 10/654* | (2014.01) | |
| *H01M 10/6567* | (2014.01) | |

(52) U.S. Cl.
CPC ...... *H01M 10/5004* (2013.01); *H01M 10/5008* (2013.01); *H01M 10/5042* (2013.01); *H01M 10/5075* (2013.01); *H01M 2004/021* (2013.01)
USPC ............. 429/105; 429/51; 429/101; 429/102; 429/103; 429/104

(56) References Cited

U.S. PATENT DOCUMENTS

| | | | |
|---|---|---|---|
| 3,448,365 A | | 6/1969 | Jacobson |
| 3,523,829 A | | 8/1970 | McCully |
| 3,811,943 A | | 5/1974 | Minck et al. |
| 3,840,407 A | | 10/1974 | Yao et al. |
| 3,883,367 A | | 5/1975 | Chiku et al. |
| 3,915,741 A | | 10/1975 | Kogiso et al. |
| 3,966,492 A | | 6/1976 | Ludwig |
| 3,980,496 A | | 9/1976 | Ludwig et al. |
| 4,024,319 A | | 5/1977 | Kagawa |
| 4,038,464 A | | 7/1977 | Baukal et al. |
| 4,044,191 A | * | 8/1977 | Evans et al. ............... 429/104 |
| 4,049,885 A | | 9/1977 | Mitoff |
| 4,065,602 A | | 12/1977 | Roche et al. |
| 4,127,705 A | | 11/1978 | Fischer et al. |
| 4,148,974 A | | 4/1979 | Eppley |
| 4,154,902 A | | 5/1979 | Schwartz |
| 4,164,610 A | | 8/1979 | Beall et al. |
| 4,208,253 A | | 6/1980 | Formaro et al. |
| 4,226,923 A | | 10/1980 | Mikkor |
| 4,230,778 A | | 10/1980 | von Benda et al. |
| 4,237,196 A | | 12/1980 | Gütmann et al. |
| 4,283,468 A | * | 8/1981 | Goebel et al. ............... 429/81 |
| 4,311,772 A | | 1/1982 | Herczog |
| 4,332,868 A | | 6/1982 | Anand et al. |
| 4,347,295 A | | 8/1982 | Herczog |
| 4,382,116 A | * | 5/1983 | Gahn et al. ............... 429/107 |
| 4,430,393 A | | 2/1984 | Bennett et al. |
| 4,578,325 A | | 3/1986 | Gotou et al. |
| 4,810,600 A | | 3/1989 | Périard et al. |
| 4,833,046 A | | 5/1989 | Roy |
| 4,886,514 A | | 12/1989 | Maget |
| 4,968,568 A | | 11/1990 | Higley |
| H858 H | | 12/1990 | Leonard et al. |
| 4,977,044 A | | 12/1990 | Ludwig |
| 5,034,290 A | | 7/1991 | Sands et al. |
| 5,134,044 A | | 7/1992 | Megerle |
| 5,158,840 A | | 10/1992 | Megerle |
| 5,162,172 A | | 11/1992 | Kaun |
| 5,258,241 A | | 11/1993 | Ledjeff et al. |
| 5,366,824 A | | 11/1994 | Nozaki et al. |
| 5,382,480 A | | 1/1995 | Molyneux |
| 5,532,077 A | * | 7/1996 | Chu ............................ 429/102 |
| 5,645,949 A | | 7/1997 | Young |
| 5,674,592 A | | 10/1997 | Clark et al. |
| 5,929,606 A | | 7/1999 | Faulk |
| 6,064,804 A | | 5/2000 | Brink et al. |
| 6,187,479 B1 | | 2/2001 | Liu |
| 6,214,487 B1 | | 4/2001 | Kelley et al. |
| 6,468,688 B2 | | 10/2002 | Kazacos et al. |
| 6,555,262 B1 | | 4/2003 | Kaiser et al. |
| 6,593,669 B1 | | 7/2003 | Lemaire et al. |
| 6,641,948 B1 | | 11/2003 | Ohlsen et al. |
| 6,692,862 B1 | | 2/2004 | Zocchi |
| 6,720,107 B1 | | 4/2004 | Holtom et al. |
| 6,953,630 B2 | | 10/2005 | Wells |
| 7,105,245 B2 | | 9/2006 | Ohlsen et al. |
| 7,157,177 B2 | | 1/2007 | Chan |
| 7,238,444 B2 | * | 7/2007 | Sada et al. ............... 429/144 |
| 7,306,822 B2 | | 12/2007 | Yadav et al. |
| RE40,218 E | | 4/2008 | Landau |
| 7,633,261 B2 | | 12/2009 | Baron et al. |
| 2002/0106549 A1 | | 8/2002 | Cooper et al. |
| 2003/0022040 A1 | | 1/2003 | Wells |
| 2003/0108788 A1 | * | 6/2003 | Miyoshi et al. ............... 429/104 |
| 2003/0134163 A1 | | 7/2003 | Markoski et al. |
| 2003/0143456 A1 | | 7/2003 | Kazacos et al. |
| 2004/0001991 A1 | | 1/2004 | Kinkelaar et al. |
| 2004/0059717 A1 | | 3/2004 | Klare et al. |
| 2004/0191127 A1 | | 9/2004 | Kornblit et al. |
| 2004/0224204 A1 | | 11/2004 | Smotkin et al. |
| 2005/0139466 A1 | | 6/2005 | Morris |
| 2005/0158614 A1 | | 7/2005 | Hennessy |
| 2005/0282063 A1 | | 12/2005 | Zecevic et al. |
| 2006/0099502 A1 | | 5/2006 | Kim et al. |
| 2006/0183016 A1 | | 8/2006 | Kazacos et al. |
| 2006/0222915 A1 | | 10/2006 | Sumino et al. |
| 2006/0251957 A1 | | 11/2006 | Darcy et al. |
| 2006/0263665 A1 | | 11/2006 | Schaevitz et al. |
| 2006/0269814 A1 | | 11/2006 | Horton, III et al. |
| 2007/0015016 A1 | | 1/2007 | Aoyama et al. |
| 2007/0026293 A1 | | 2/2007 | Kim et al. |
| 2007/0065708 A1 | | 3/2007 | Owejan et al. |
| 2007/0209944 A1 | | 9/2007 | Aune et al. |
| 2007/0215483 A1 | | 9/2007 | Johansen et al. |
| 2007/0218321 A1 | | 9/2007 | O'Brien |
| 2008/0003507 A1 | | 1/2008 | Nanjundiah |
| 2008/0008911 A1 | | 1/2008 | Stroock et al. |
| 2008/0023321 A1 | | 1/2008 | Sadoway |
| 2008/0026267 A1 | | 1/2008 | Rikihisa et al. |
| 2008/0044725 A1 | | 2/2008 | Sadoway et al. |
| 2008/0115930 A1 | | 5/2008 | Peters et al. |
| 2008/0124586 A1 | | 5/2008 | Wang et al. |
| 2008/0318089 A1 | | 12/2008 | Schneider et al. |
| 2009/0017379 A1 | | 1/2009 | Inatomi et al. |
| 2009/0053596 A1 | | 2/2009 | Stauffer |
| 2009/0068515 A1 | | 3/2009 | Chen et al. |
| 2009/0071841 A1 | | 3/2009 | Pal et al. |
| 2009/0155631 A1 | | 6/2009 | Baek et al. |
| 2009/0233156 A1 | * | 9/2009 | Kroupenkine et al. ......... 429/50 |
| 2009/0242036 A1 | | 10/2009 | Kolodner et al. |
| 2010/0003586 A1 | | 1/2010 | Sahu |
| 2010/0009231 A1 | | 1/2010 | Kim et al. |
| 2010/0047671 A1 | | 2/2010 | Chiang et al. |
| 2010/0092843 A1 | | 4/2010 | Conway |
| 2010/0304192 A1 | | 12/2010 | Chan et al. |
| 2011/0014503 A1 | | 1/2011 | Bradwell et al. |
| 2011/0281169 A1 | | 11/2011 | Zheng et al. |
| 2012/0077070 A1 | | 3/2012 | Soloveichik et al. |

FOREIGN PATENT DOCUMENTS

| | | |
|---|---|---|
| CN | 100517851 | 7/2009 |
| JP | 2004536437 A | 12/2004 |

OTHER PUBLICATIONS

MacFarlane et al.; "Lithium-doped plastic crystal electrolytes exhibiting fast ion conduction for secondary batteries"; Nature; Bearing a date of Dec. 16, 1999; pp. 792-794; vol. 402; Macmillan Magazines Ltd.

Patel, Monalisa; Bhattacharyya, Aninda J.; "Plastic-polymer composite electrolytes: Novel soft matter electrolytes for rechargeable lithium batteries"; Electrochemistry Communications; Bearing a date of 2008; pp. 1912-1915; vol. 10; Elsevier B.V.

PCT International Search Report; International App. No. PCT/US2010/002101; bearing a date of Sep. 17, 2010; pp. 1-3.

(56) References Cited

OTHER PUBLICATIONS

PCT International Search Report; International App. No. PCT/US 10/02100; bearing a date of Sep. 28, 2010; pp. 1-2.

U.S. Appl. No. 12/658,943, Deane et al.

Armand, Michel et al.; "Ionic-liquid materials for the electrochemical challenges of the future"; Nature Materials; bearing a date of Aug. 2009; pp. 621-629; vol. 8; © 2009 Macmillan Publishers Limited.

Wright, Randy; "New battery could change world, one house at a time"; Daily Herald; bearing a date of Apr. 4, 2009; pp. 1-6; located at http://www.heraldextra.com/news/article_b0372fd8-3f3c-11de-ac77-001cc4c002e0.html; printed on Aug. 18, 2009.

Brown et al.; "Chapter 20, Electrochemistry"; Chemistry, The Central Science; pp. 730-732; 7th Ed; Prentice Hall; NH; US.

Nahtigal, Istok Gorazd; "Supercritical Aqueous Solutions of Sodium Chloride: Classical Insights into Nucleation and Reactivity"; a thesis submitted to the Department of Chemistry in conformity with the requirements for the degree of Master of Science, Queen's University, Kingston, Ontario, Canada; Nov. 2008; cover page, pp. ii-xiii and pp. 1-106 (119 pages total).

Colom et al.; "Bismuth electrodeposition in molten salts"; Electrochimica Acta; Aug. 1, 1965; manuscript received Oct. 28, 1964; pp. 835-847; vol. 10; Pergamon Press Ltd., Northern Ireland.

European Patent Office; Supplementary European Search Report; Pursuant to Rule 62 EPC; App. No. EP 10 80 4819; Mar. 27, 2014 (received by our agent on Apr. 7, 2014); pp. 1-2.

European Patent Office; Supplementary European Search Report; Pursuant to Rule 62 EPC; App. No. EP 10 76 0135; Mar. 27, 2014 (received by our agent on Apr. 7, 2014); pp. 1-2.

Good et al.; "A new approach for determining roughness by means of contact angles on solids"; *Mittal Festschrift;* bearing a date of 1998; pp. 181-197; VSP.

\* cited by examiner

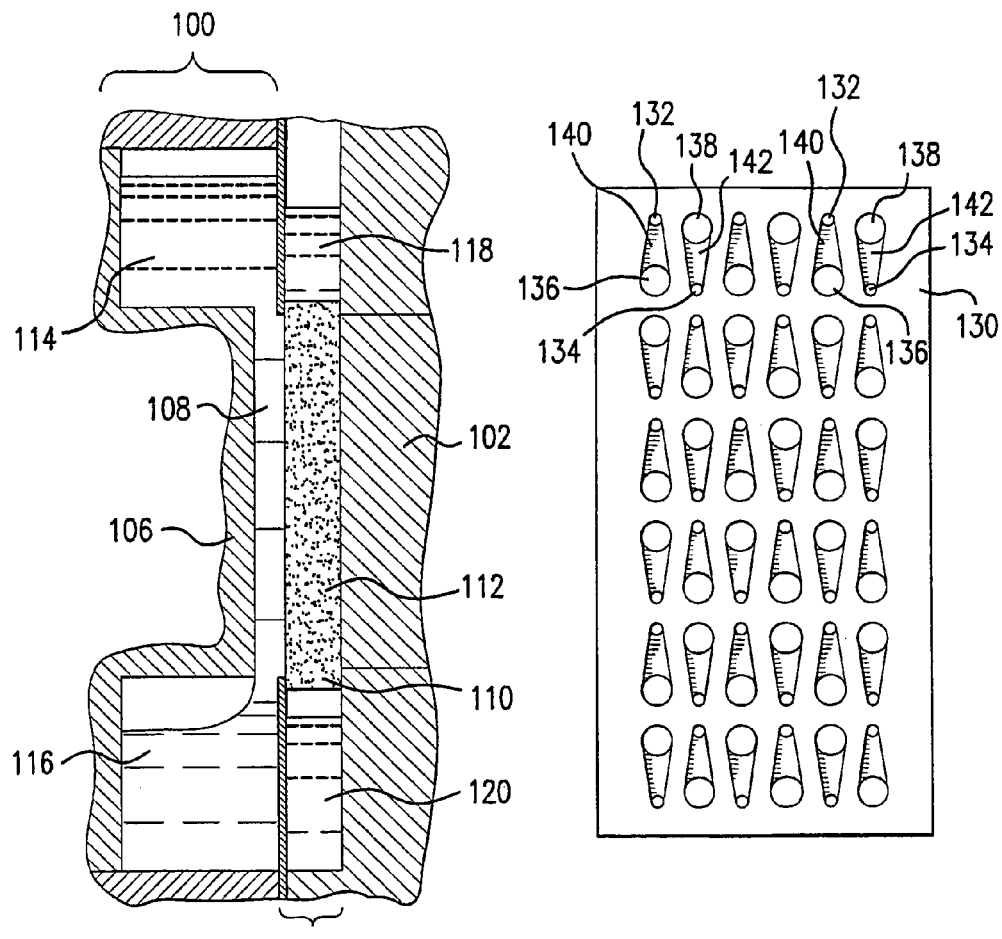

FLUID-SURFACED ELECTRODE

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

RELATED APPLICATIONS

For purposes of the USPTO extra-statutory requirements, the present application constitutes a continuation-in-part of U.S. patent application Ser. No. 12/462,205, entitled FLUID-SURFACED ELECTRODE, naming Geoffrey F. Deane, Bran Ferren, William Gates, W. Daniel Hillis, Roderick A. Hyde, Muriel Y. Ishikawa, Edward K. Y. Jung, Jordin T. Kare, Nathan P. Myhrvold, Clarence T. Tegreene, David B. Tuckerman, Thomas A. Weaver, Charles Whitmer, Lowell L. Wood, Jr., Victoria Y. H. Wood as inventors, filed 29 Jul. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/589,309, entitled FLUID-SURFACED ELECTRODE, naming Geoffrey F. Deane, Bran Ferren, William Gates, W. Daniel Hillis, Roderick A. Hyde, Muriel Y. Ishikawa, Edward K. Y. Jung, Jordin T. Kare, Nathan P. Myhrvold, Clarence T. Tegreene, David B. Tuckerman, Thomas A. Weaver, Charles Whitmer, Lowell L. Wood, Jr., Victoria Y. H. Wood as inventors, filed 20 Oct. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/589,322, entitled FLUID-SURFACED ELECTRODE, naming Geoffrey F. Deane, Bran Ferren, William Gates, W. Daniel Hillis, Roderick A. Hyde, Muriel Y. Ishikawa, Edward K. Y. Jung, Jordin T. Kare, Nathan P. Myhrvold, Clarence T. Tegreene, David B. Tuckerman, Thomas A. Weaver, Charles Whitmer, Lowell L. Wood, Jr., Victoria Y. H. Wood as inventors, filed 20 Oct. 2009, which is currently co-pending, or is an application of which a currently co-pending application is entitled to the benefit of the filing date.

For purposes of the USPTO extra-statutory requirements, the present application constitutes a continuation-in-part of U.S. patent application Ser. No. 12/589,310, entitled FLUID-SURFACED ELECTRODE, naming Geoffrey F. Deane, Bran Ferren, William Gates, W. Daniel Hillis, Roderick A. Hyde, Muriel Y. Ishikawa, Edward K. Y. Jung, Jordin T. Kare, Nathan P. Myhrvold, Clarence T. Tegreene, David B. Tuckerman, Thomas A. Weaver, Charles Whitmer, Lowell L. Wood, Jr., Victoria Y. H. Wood as inventors, filed 20 Oct. 2009, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

Recent attention to "green" generation of energy has produced a variety of new processes and refinements of existing methods for providing electrical power. However, many renewable energy sources (e.g., solar power and wind power) may be only intermittently available, thus possibly requiring substantial storage capacity in order to provide electricity on demand. Even continuously-available power sources (e.g., nuclear) may benefit from electrical storage allowing intermittent peak loading in excess of continuously-available average capacity. Existing batteries for these purposes can be expensive, especially on a lifetime basis (considering limited cycle lifetimes).

Further, existing batteries may have energy densities substantially below those of fossil fuels, thus motivating continued primary use of hydrocarbon fuels for personal transport despite known negative effects of the use of hydrocarbons for such purposes Improved battery technology could enable more widespread use of electric vehicles and "green" power generation.

SUMMARY

In one aspect, an electrochemical device includes two electrodes (an anode and a cathode) and an electrolyte arranged to conduct an ionic current from a surface in contact with one electrode to a surface in contact with the other electrode. At least one (or optionally both) of the electrodes includes an electrochemically active fluid layer having fluid properties that permit at least a portion of it to cling to a substantially smooth solid support by a surface energy effect, a surface of the electrochemically active fluid layer being in contact with the electrolyte.

If both electrodes include an electrochemically active fluid layer, these layers may be in contact with a common surface of the solid support. The solid support may include a fluid-directing structure such as a surface channel, conduit, or pattern of regions having different wetting properties, any of which may be configured to direct fluid flow via surface tension. The fluid-directing structure may be configured to adjust a fluid surface area in response to pressure, and may be configured to control flow rate or flow direction of a fluid. The fluid-directing structure may be configured to distribute fluid according to a flow pattern selected to optimize an electrical property of the electrochemical device (e.g., by maximizing or minimizing the property, or by adjusting it to obtain a selected value). The device may be configured to dynamically change a property of the fluid-directing structure, such as surface energy, wetting behavior, shape, or temperature, for example in response to a property of the device such as global current, global voltage, local current, local voltage, current density, amount or composition of electrochemically active fluid, or amount or composition of reaction products, and such dynamic change may alter a flow characteristic of the electrochemically active fluid layer.

At least a portion of the electrochemically active fluid layer may cling to the substantially smooth solid support in a manner that varies spatially. The substantially smooth solid support may include an electrical contact, and may be curved. The solid support and the fluid layer may differ in composition.

The electrolyte may conduct an ionic current by motion of positive ions, negative ions, or both, and may conduct current from cathode to anode, anode to cathode, or both. The electrolyte may include a solid surface which may be impervious to the electrochemically active fluid, and may include a fluid-directing structure configured to direct fluid flow of the electrochemically active fluid layer. The electrolyte may include an ion-transport fluid through which an ion can move to produce the ionic current, and may further include a solid structure, such as a porous structure infiltrated by the ion-transport fluid (e.g., a sponge, a wick, a plurality of fibers, a fabric, a partially sintered body, a mesh, a perforated sheet, a textured surface, or an agglomeration of particles). The ion-transport fluid may wet the porous structure, and the electrochemically active fluid may wet the ion-transport fluid more than it wets the solid structure, including not wetting the solid structure. If the cathode and the anode each include an electrochemically active fluid layer, the ion-transport fluid may wet each of the electrochemically active fluid layers more than they wet one another (including a case in which they do not wet one another). The ion-transport fluid may be super-critical, and may contact an electrochemically active fluid at one or both electrodes. The ion-transport fluid may be immiscible with the electrochemically active fluid. The ion-transport fluid may be connected to an external reservoir, and may be configured to remove heat by flow of the ion-transport fluid.

The electrolyte may have a thickness of less than about 1 cm, 1 mm, 100 µm, 10 µm, 1 µm, 100 nm, or 10 nm. It may include a reaction product of at least a portion of the cathode with at least a portion of the anode. If the reaction product is a fluid, it may wet a solid surface of the electrolyte or of at least one of the electrodes, or may cling to a solid surface of at least one of the electrodes. The reaction product may be connected to a reservoir, and the electrolyte may be configured to remove heat by flow of the reaction product. A reaction product of at least a portion of the cathode with at least a portion of the anode may be intermixed with the electrochemically active fluid. Either the electrolyte or one of the electrodes may include a fluid-reacting structure configured to direct a reaction product of at least a portion of the cathode with at least a portion of the anode.

The electrochemically active fluid layer may include a liquid, a paste, a gel, an emulsion, a thixotropic fluid, a super-critical fluid, or a non-Newtonian fluid, and may be an ionic or an electronic conductor. It may include a carrier fluid that is not electrochemically active. It may wet or cling to the electrolyte. The fluid layer may include a dissolved gas such as oxygen, or a liquid metal such as an alloy. The liquid metal may be liquid at about 100° C., 50° C., 25° C., or 0° C. The electrochemically active fluid may be connected to an external reservoir, and may be configured to transport heat energy away from the battery.

The anode may include lithium, sodium, mercury, tin, cesium, rubidium, potassium, or an alloy, solution, amalgam, or intermetallic compound of any of these. The cathode may include gallium, iron, mercury, tin, sulfur, chlorine, or an alloy, solution, amalgam, or intermetallic compound of any of these. The electrolyte may include perchlorate, ether, graphene, polyimide, succinonitrile, polyacrylonitrile, polyethylene oxide, polyethylene glycol, ethylene carbonate, beta-alumina, or an ion-conducting glass. The electrochemical device may include a cooling system, which may include a heat pipe, a heat exchanger, or a microchannel.

In another aspect, a method of supplying electrochemical energy includes connecting an electrical load to a first and a second electrode separated by an electrolyte arranged to conduct an ionic current from a first electrolyte surface in contact with the first electrode to a second electrolyte surface in contact with the second electrode. At least one of the electrodes includes an electrochemically active fluid sheet that clings to a solid support by a surface energy effect in opposition to an acceleration field, such as a gravitational field. A surface of the fluid sheet is in contact with the electrolyte.

In another aspect, a method of charging a battery includes connecting an electrical potential to a first and a second electrode separated by an electrolyte arranged to conduct an ionic current from a first electrolyte surface in contact with the first electrode to a second electrolyte surface in contact with the second electrode. At least one of the electrodes includes an electrochemically active fluid sheet that clings to a solid support by a surface energy effect in opposition to an acceleration field, such as a gravitational field. A surface of the fluid sheet is in contact with the electrolyte.

In another aspect, a method of charging a battery having an electrode including an electrochemically active fluid layer that clings to a substantially smooth solid support by a surface energy effect includes refreshing the electrochemically active fluid layer by flowing the electrochemically active fluid along the substantially smooth solid support. Refreshing may include removing fluid depleted of an electrochemical species and introducing fluid containing the electrochemical species, and may include flowing the fluid in a substantially laminar flow.

In another aspect, a method of refreshing a battery having an electrolyte layer including an ion transport fluid includes refreshing the ion transport fluid by flowing it through the electrolyte layer. Refreshing the ion transport fluid may include removing fluid depleted of an electrochemical species and introducing fluid containing the electrochemical species.

In another aspect, a method of refreshing a battery that produces a fluid reaction product of an electrochemical reaction includes refreshing the battery by flowing the fluid reaction product.

In another aspect, an electrode for a battery includes an electrochemically active fluid layer that clings to a substantially smooth solid support by a surface energy effect, the electrochemically active fluid layer being configured for contact with an electrolyte.

In another aspect, a method of making a battery includes coupling an electrolyte with two electrodes, at least one of the electrodes being configured to support an electrochemically active fluid layer in ionic communication with the electrolyte by a surface energy effect on a substantially smooth solid support.

In another aspect, an electrochemical device includes two electrodes (an anode and a cathode), and an electrolyte arranged to conduct an ionic current from one electrode to the other. At least one of the electrodes includes an electrochemically active fluid layer having a surface in contact with the electrolyte, and a micropatterned support including a fluid-directing structure configured to direct the electrochemically active fluid according to a predetermined flow pattern. The micropatterned support may be constructed by micromachining, lithography, molding, printing, stamping, or replica-printing, and may include fluid-directing structures configured to direct a plurality of fluids, each according to a predetermined flow pattern. It may include a first fluid-directing structure configured to direct an electrochemically active fluid of the anode, and a second fluid-directing structure configured to direct an electrochemically active fluid of the cathode. The micropatterned support may include a first fluid-directing structure configured to wet an electrochemically active fluid of the anode, and a second fluid-directing structure configured to wet an electrochemically active fluid of the cathode. It may be configured to spatially vary the contact between the electrochemically active fluid and the electrolyte.

The micropatterned support may include a fluid channel, which may have a surface that wets the electrochemically active fluid or may be configured to retain the electrochemically active fluid by surface tension. A dimension of the fluid channel may vary along its length, and it may be parallel to the surface of the electrochemically active fluid in contact with the electrolyte or not parallel to it (e.g., perpendicular). The micropatterned support may include a plurality of fluid channels, which may be interconnected. The micropatterned support may include first and second regions that differ in their wetting behavior with the electrochemically active fluid layer. The fluid-directing structure may include a defined surface topology on the micropatterned support, such as a plurality of surface projections.

The electrochemical device may be configured to dynamically change a property of the fluid-directing structure, such as surface energy, wetting behavior, shape, or temperature, for example to alter a flow characteristic of the electrochemically active fluid layer. Dynamically changing the property of the fluid-directing structure may be in response to a property of the device, such as global current, global voltage, local current, local voltage, current density, amount or composition of electrochemically active fluid, or amount or composition of reaction products.

In another aspect, a method of supplying electrochemical energy includes connecting an electrical load to first and second electrodes separated by an electrolyte arranged to conduct an ionic current from a first electrolyte surface in contact with the first electrode to a second electrolyte surface in contact with the second electrode, at least one of the electrodes including a micropatterned support including an fluid-directing structure, and flowing an electrochemically active fluid along the micropatterned support in a configuration in which the electrochemically active fluid contacts the electrolyte and is directed by the fluid-directing structure to flow according to a predetermined flow pattern.

In another aspect, a method of charging a battery includes connecting an electrical potential to first and second electrodes separated by an electrolyte arranged to conduct an ionic current from a first electrolyte surface in contact with the first electrode to a second electrolyte surface in contact with the second electrode, at least one of the electrodes including a micropatterned support including an fluid-directing structure, and flowing an electrochemically active fluid along the micropatterned support in a configuration in which the electrochemically active fluid contacts the electrolyte and is directed by the fluid-directing structure to flow according to a predetermined flow pattern.

In another aspect, a method of charging a battery having an electrode including an electrochemically active fluid layer that flows along a micropatterned solid support and contacts an electrolyte includes refreshing the electrochemically active fluid by flowing it along the solid support according to a predetermined flow pattern. Refreshing the electrochemically active fluid may include removing electrochemically active fluid depleted of an electrochemical species and introducing electrochemically active fluid containing the electrochemical species. Flowing the electrochemically active fluid may include flowing it in a substantially laminar flow.

In another aspect, an electrode for a battery includes an electrochemically active fluid layer that clings to a micropatterned solid support by a surface energy effect, the electrochemically active fluid being configured for contact with an electrolyte, and the micropatterned solid support including a fluid-directing structure configured to direct the electrochemically active fluid according to a predetermined flow pattern.

In another aspect, a method of making a battery includes coupling an electrolyte with two electrodes including an anode and a cathode, wherein at least one of the electrodes is configured to support an electrochemically active fluid layer in ionic communication with the electrolyte on a micropatterned solid support, the micropatterned solid support including a fluid-directing structure configured to direct the electrochemically active fluid according to a predetermined flow pattern.

In another aspect, an electrochemical device includes two electrodes (a cathode and an anode), and an electrolyte arranged to conduct an ionic current from a first electrolyte surface in contact with one of the electrodes to a second electrolyte surface in contact with another of the electrodes. At least one of the electrodes includes an electrochemically active fluid layer having a surface in contact with the electrolyte and a micropatterned support including a fluid-directing structure configured to retain the electrochemically active fluid at a predetermined location.

In another aspect, a method of supplying electrochemical energy includes connecting an electrical load to a first and second electrode separated by an electrolyte arranged to conduct an ionic current from a first electrolyte surface in contact with the first electrode to a second electrolyte surface in contact with the second electrode. At least one of the first and second electrodes includes a micropatterned support including a fluid-directing structure. The method further includes flowing an electrochemically active fluid along the micropatterned support in a configuration in which the electrochemically active fluid contacts the electrolyte and is retained by the fluid-directing structure at a predetermined location.

In another aspect, a method of charging a battery includes connecting an electrical potential to a first and second electrode separated by an electrolyte arranged to conduct an ionic current from a first electrolyte surface in contact with the first electrode to a second electrolyte surface in contact with the second electrode. At least one of the first and second electrodes includes a micropatterned support including a fluid-directing structure. The method further includes flowing an electrochemically active fluid along the micropatterned support in a configuration in which the electrochemically active fluid contacts the electrolyte and is retained by the fluid-directing structure at a predetermined location.

In another aspect, a method of charging a battery having an electrode including an electrochemically active fluid layer that flows along a micropatterned solid support and contacts an electrolyte includes refreshing the electrochemically active fluid layer by flowing the electrochemically active fluid along the solid support while retaining electrochemically active fluid at a predetermined location. Refreshing the electrochemically active fluid layer may include removing electrochemically active fluid depleted of an electrochemical species and introducing electrochemically active fluid containing the electrochemical species. Flowing the electrochemically active fluid may include flowing the electrochemically active fluid in a substantially laminar flow.

In another aspect, an electrode for a battery includes an electrochemically active fluid layer that clings to a micropatterned solid support by a surface energy effect, the electrochemically active fluid layer being configured for contact with an electrolyte, and the micropatterned solid support including a fluid-directing structure configured to retain electrochemically active fluid at a predetermined location.

In another aspect, a method of making a battery includes coupling an electrolyte with two electrodes (an anode and a cathode). At least one of the electrodes is configured to support an electrochemically active fluid layer in ionic communication with the electrolyte on a micropatterned solid support, the micropatterned solid support including a fluid-directing structure configured to retain the electrochemically active fluid at a predetermined location.

In another aspect, an electrochemical device includes two electrodes (a cathode and an anode), and an electrolyte arranged to conduct an ionic current from a first electrolyte surface in contact with one of the electrodes to a second electrolyte surface in contact with another of the electrodes. The cathode includes a first electrochemically active fluid layer configured to cling to a first microfeatured fluid-directing structure arranged to engage the electrolyte, and the anode includes a second electrochemically active fluid layer configured to cling to a second microfeatured fluid-directing structure arranged to engage the electrolyte. The first microfeatured fluid-directing structure may be configured to direct the first electrochemically active fluid according to a first predetermined flow pattern, while the second microfeatured fluid-directing structure may be configured to direct the second electrochemically active fluid according to a second predetermined flow pattern. The first microfeatured fluid-directing structure may be configured to retain the first electrochemically active fluid at a first predetermined location, while the second microfeatured fluid-directing structure may be configured to retain the second electrochemically active fluid at a second predetermined location. The first microfeatured fluid-directing structure may be micromachined, constructed by lithography, or constructed by molding, printing, stamping, or replica-printing.

The first microfeatured fluid-directing structure may include a plurality of fibers or a plurality of particles, which may be affixed to a surface of the electrolyte. The first microfeatured fluid-directing structure may includes a fluid channel, which may have a dimension that varies along its length, and may be parallel or not parallel to a surface of the electrolyte. The first microfeatured fluid-directing structure may include a plurality of fluid channels, at least two of which may be interconnected. It may have a property that varies spatially. The electrochemical device may be configured to dynamically change a property of the first microfeatured fluid-directing structure.

In another aspect, a method of supplying electrochemical energy includes connecting an electrical load to a cathode and an anode separated by an electrolyte, the electrolyte arranged to conduct an ionic current from a first electrolyte surface in contact with the cathode to a second electrolyte surface in contact with the anode. The cathode includes a first microfeatured fluid-directing structure arranged to engage the electrolyte and the anode includes a second microfeatured fluid-directing structure arranged to engage the electrolyte. The method further includes flowing a first electrochemically active fluid along the first microfeatured fluid-directing structure in engagement with the electrolyte, and flowing a second electrochemically active fluid along the second microfeatured fluid-directing structure in engagement with the electrolyte.

In another aspect, a method of charging a battery includes connecting an electrical potential to a cathode and an anode separated by an electrolyte, the electrolyte arranged to conduct an ionic current from a first electrolyte surface in contact with the cathode to a second electrolyte surface in contact with the anode. The cathode includes a first microfeatured fluid-directing structure arranged to engage the electrolyte and the anode includes a second microfeatured fluid-directing structure arranged to engage the electrolyte. The method further includes flowing a first electrochemically active fluid along the first microfeatured fluid-directing structure in engagement with the electrolyte, and flowing a second electrochemically active fluid along the second microfeatured fluid-directing structure in engagement with the electrolyte.

In another aspect, a method of charging a battery having an electrode including a first electrochemically active fluid layer that clings to a first microfeatured fluid-directing structure arranged to engage an electrolyte and a second electrochemically active fluid layer that clings to a second microfeatured fluid-directing structure arranged to engage the electrolyte includes refreshing the first electrochemically active fluid layer by flowing the first electrochemically active fluid along the first microfeatured fluid-directing structure. Refreshing the first electrochemically active fluid layer may include removing electrochemically active fluid depleted of a charge carrier and introducing electrochemically active fluid containing the charge carrier. Flowing the first electrochemically active fluid may include flowing the first electrochemically active fluid in a substantially laminar flow.

In another aspect, a pair of electrodes for a battery includes a first microfeatured fluid-directing structure arranged to engage an electrolyte and to support a first electrochemically active fluid layer, and a second microfeatured fluid-directing structure arranged to engage the electrolyte and to support a second electrochemically active fluid layer.

In another aspect, a method of making a battery includes coupling an electrolyte with two electrodes (a cathode and an anode), the cathode including a first microfeatured fluid-directing structure arranged to engage the electrolyte and to support a first electrochemically active fluid layer and the anode including a second microfeatured fluid-directing structure arranged to engage the electrolyte and to support a second electrochemically active fluid layer.

In another aspect, an electrochemical device includes two electrodes (a cathode including a first electrochemically active fluid layer and an anode including a second electrochemically active fluid layer), an electrolyte arranged to conduct an ionic current from a first electrolyte surface in contact with one of the electrodes to a second electrolyte surface in contact with another of the electrodes via an ion-transport fluid, and a fluid control structure configured to engage a controlled fluid through surface tension, the controlled fluid being the first electrochemically active fluid, the second electrochemically active fluid, or the ion-transport fluid. The cathode and/or the anode may further include a solid support, and the electrochemically active fluid layer(s) may cling to the solid support by a surface energy effect. The first and/or second electrochemically active fluid layer may be configured to flow along a surface of the electrolyte. The ion-transport fluid may be configured to flow within or through the device. The electrolyte may further include a solid structure, such as a porous structure infiltrated by the ion-transport fluid. The porous structure may include a sponge, a wick, a plurality of fibers, a fabric, a partially sintered body, a mesh, a perforated sheet, a textured surface, or an agglomeration of particles. The ion-transport liquid may wet the porous structure. At least one of the first and second electrochemically active fluids may wet the ion-transport fluid more than it wets the solid structure, including not wetting the solid structure. The ion-transport fluid may wetseach of the first and second electrochemically active fluid layers more than the electrochemically active fluid layers wet one another, and the electrochemically active fluid layers may not wet one another. The ion-transport fluid may be supercritical. The ion-transport fluid may be in contact with only one of or with both of the first and second electrochemically active fluid layers. It may be immiscible with the electrochemically active fluid, and may be connected to an external reservoir.

The electrolyte may be configured to remove heat by flow of the ion-transport fluid. The fluid control structure may configured to retain or to direct flow of the controlled fluid, and may be microfeatured, micropatterned, or substantially smooth.

In another aspect, a method of supplying electrochemical energy includes connecting an electrical load to a first and second electrode separated by an electrolyte arranged to conduct an ionic current from a first electrolyte surface in contact with the first electrode to a second electrolyte surface in contact with the second electrode via an ion-transport fluid. The first electrode includes a first electrochemically active fluid layer and the second electrode includes a second electrochemically active fluid layer. The method further includes controlling via surface tension flow of the ion-transport fluid, the first electrochemically active fluid layer, or the second electrochemically active fluid layer.

In another aspect, a method of charging a battery includes connecting an electrical potential to a first and second electrode separated by an electrolyte arranged to conduct an ionic current from a first electrolyte surface in contact with the first electrode to a second electrolyte surface in contact with the second electrode via an ion-transport fluid. The first electrode includes a first electrochemically active fluid layer and the second electrode includes a second electrochemically active fluid layer. The method further includes controlling via surface tension flow the ion-transport fluid, the first electrochemically active fluid layer, or the second electrochemically active fluid layer.

In another aspect, a method of charging a battery having a first electrode including a first electrochemically active fluid layer, a second electrode including a second electrochemically active fluid layer, and an electrolyte including an ion-transport fluid includes refreshing by flowing the ion-transport fluid, the first electrochemically active fluid layer, or the second electrochemically active fluid layer. Refreshing by flowing may include removing fluid depleted of an electrochemical species and introducing fluid containing the electrochemical species, and may include flowing the fluid in a substantially laminar flow.

In another aspect, a method of making a battery includes coupling an electrolyte with two electrodes (an anode and a cathode), the first electrode being configured to support a first electrochemically active fluid layer in ionic communication with the electrolyte and the second electrode being configured to support a second electrochemically active fluid layer in ionic communication with the electrolyte.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 1 is a schematic of an electrochemical device.

FIG. 2 is a schematic of an electrode surface for another electrochemical device.

DETAILED DESCRIPTION

Figure 3:
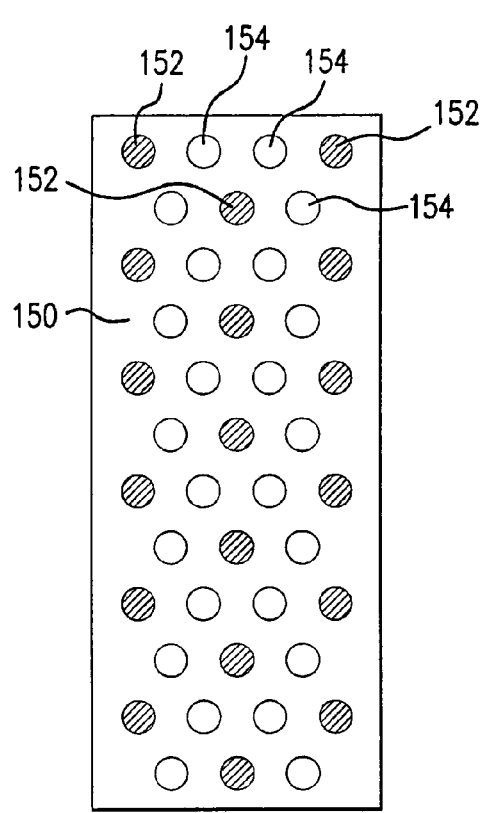
FIG. 3 is a schematic of another electrode surface for an electrochemical device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

As used herein, the term "fluid" includes any condensed phase lacking substantial shear strength, including liquids, pastes, gels, emulsions, and supercritical fluids. Unless context dictates otherwise, materials within electrochemical devices that are described as "fluids" have a fluidic character at the working temperature and pressure of the device, which may be room temperature or another temperature (e.g., 0° C., 25° C., 50° C., 75° C., 100° C., or any other suitable temperature), and ambient pressure or another suitable working pressure.

As used herein, the term "smooth," when used to describe a surface wetted by a fluid layer, includes a surface having a local radius of curvature significantly greater than the thickness of the fluid layer.

As used herein, the term "cling," when used to describe a fluid in contact with a solid, includes a fluid that wets or otherwise substantially adheres to the solid, for example with a force sufficient to maintain contact with the solid in opposition to a gravitational force.

As used herein, the term "ionic current" includes any movement of electrical charge created by bulk diffusion or flow of ions. An "ionic current" is said to flow from a positive potential to a negative potential, even if it is produced in part or in whole by a movement of (negatively charged) ions in the opposite direction. A material "conducts" ionic current if it permits ions to pass through it to create a net flow of charge. These ions may be already present in the material or may enter through an interface.

As used herein, the term "micropatterned" includes surfaces exhibiting structures of roughly submillimeter size (including micron-scale and nanoscale structures), where these structures form predetermined shapes or have a predetermined effect on fluid flow in their vicinity. Micropatterned surfaces may, but need not, include repeating arrays of features, and may be constructed, for example, by micromachining, lithography, molding (including extrusion), printing, stamping, replica-printing, or other processes.

As used herein, the term "microfeatured" includes surfaces exhibiting structures of roughly submillimeter size (including micron-scale and nanoscale structures), where the shapes or flow characteristics of the structures may (but need not) have a random component.

As used herein, the term "impervious" includes substances that resist flow of a specified fluid. A substance may still be termed "impervious" to a fluid if it is gradually degraded by the fluid over time.

FIG. 1 is a schematic of an electrochemical device such as a battery. As shown, the device includes cathode 100, anode 102, and electrolyte 104. Cathode 100 includes a solid support 106 and a fluid layer 108 that clings to the solid support. In some embodiments, fluid layer 108 may also wet electrolyte 104. The illustrated electrolyte 104 includes an ion-transport fluid 110 infiltrated into a porous layer 112 (e.g., a sponge, a wick, a plurality of substantially parallel fibers, a fabric, a partially sintered body, a mesh, a perforated sheet, a textured surface such as a surface including a plurality of projections, or an agglomeration of particles of any appropriate shape or size). In some embodiments, ion-transport fluid 110 may wet porous layer 112. In other embodiments (not shown), electrolyte 104 may be a fluid, a solid, or a combination other than the infiltrated solid illustrated in FIG. 1 (e.g., a fluid layer that clings to a solid layer). While both cathode 100 and anode 102 are in contact with electrolyte 104 during operation of the device, in some embodiments, either electrode may be in contact only with the solid or only with the liquid portions of the electrolyte 104, or with both (if both are present). In the illustrated embodiment, anode 102 is a solid structure. In other embodiments (not shown), anode 102 may include a fluid layer and a solid support analogous to those shown in the cathode 100 of FIG. 1, and may further include one or more reservoirs as discussed below in connection with cathode 100. While the illustrated embodiment is substantially flat, in other embodiments the device may be curved, with one or two radii of curvature.

In the illustrated embodiment, cathode 100 further includes reservoirs 114 and 116 for cathode fluid layer 108. During operation of the battery, cathode fluid may flow from reservoir 114 to reservoir 116 along support 106 (which may be a substantially smooth support), replenishing electrochemical species which may be depleted in the cathode fluid (note that "depleted" may include species that are reduced in concentration, rather than totally exhausted). In some embodiments, reservoirs 114 and 116 may be connected, allowing recirculation of cathode fluid. The cathode fluid may be composed primarily of the species that will participate in the electrochemical reaction, or it may include a carrier fluid (which may be electrochemically inert). A complementary half-reaction occurs at anode 102. Electrolyte 104 supports transfer of at least one ionic species between cathode 100 and anode 102, while preventing transfer of electrons. The differing chemical potentials of the two half-reactions thus generate an electrical potential across the battery between cathode 100 and anode 102.

For example, in some embodiments, the cathode fluid may be substantially composed of a carrier fluid that is liquid at the desired working temperature (e.g., mercury, gallium, or a gallium alloy such as GALINSTAN™, a near-eutectic alloy of gallium, indium, and tin), doped with a lithium-containing compound such as $LiFePO_4$. As lithium ions are converted to neutral lithium in the cathode fluid, depleted fluid flows into reservoir 116, while fresh lithium ions flow from reservoir 114 into fluid layer 108. Solid support 106 may be any of the very wide variety of materials wetted by the cathode fluid. In an embodiment including a fluid-surfaced anode as described above, the anode fluid may be a sodium-potassium alloy (e.g., the eutectic $NaK_2$) doped with lithium metal (e.g., at a concentration of about 10 atom-%). Electrolyte 104 may include any of a wide varieties of porous solid supports (e.g., polytetrafluoroethylene or polyethylene terephthalate), infiltrated with an organic solvent (e.g., diethyl ether) containing a dissolved lithium salt such as lithium perchlorate. In some embodiments, it may be possible to dispense with the porous solid support, using an electrolyte layer composed of the fluid organic solvent and (if necessary) a dissolved salt, as long as surface tension or other forces prevent anode 100 and cathode 102 from contacting one another to create an internal short (for example, anode and cathode fluids may wet the electrolyte fluid more than they wet one another, tending to reduce the possibility of a short, or some or all of the fluids may be immiscible). In other embodiments, the electrolyte layer may be a solid having sufficient ion transport properties, such as beta-alumina, a sulfide glass or another ion-conducting glass such as Li super-ion conducting glass (LISICON), a lithium-zinc-germanium oxide glass. Other suitable electrolyte materials are described, for example, in Patel, et al., "Plastic-polymer composite electrolytes: Novel soft matter electrolytes for recharegable lithium batteries," *Electrochem. Comm.* 10(12):1912-1915 (2008); MacFarlane, et al., "Lithium-doped plastic crystal electrolytes exhibiting fast ion conduction for secondary batteries," *Nature* 402:792-794 (1999); and U.S. Pat. No. 4,237,196, "Sodium ion-conducting glass electrolyte for sodium-sulfur batteries" (1980), all of which are incorporated by reference herein. In the illustrated embodiment, the electrolyte layer is connected to reservoirs 118, 120 which may be used to refresh the electrolyte fluid in an analogous manner to the refreshment of the cathode fluid using reservoirs 114, 116.

The electrolyte layer may be partially or fully composed of a reaction product of the anode and cathode fluids (e.g., the anode and cathode fluids may include monomers that participate in interfacial polymerization). For some such embodiments, it may even be possible to withdraw depleted electrode fluids by continuously removing a solid or liquid reaction product during battery operation. In some embodiments, reaction products may also be found in either the anode or the cathode fluids, in which case they may optionally be removed by flow of the cathode or anode fluids. In some embodiments, reaction products may cling to solid support 106 (or an analogous structure of the anode) by a surface energy effect, thus potentially clearing them from the electrode-electrolyte interface. The solid support may also include one or more fluid-directing structures that facilitate flow of a reaction product.

In some embodiments, it is preferable to have as thin an electrolyte as possible while still avoiding arcing between electrodes. An electrode may be as thick as 1 cm or more, but may also be as thin as 1 mm, 100 µm, 10 µm, 1 µm, 100 nm, or even 10 nm.

In another embodiment, an electrochemical device such as that shown in FIG. 1 may be used to recharge a depleted electrochemically active fluid. In such an embodiment, rather than drawing electrical current from the potential difference between the anode and the cathode, a voltage is applied to drive the reaction in reverse, returning the electrochemically active fluid to a higher chemical energy state for later use in the same or another device.

In some embodiments, solid support 106 may include one or more fluid-directing features (not shown). For example, solid support 106 may include ripples or channels that direct fluid flow, or areas of variable surface energy that influence wetting behavior of the fluid. In some embodiments, surface energy may be dynamically adjusted, for example using techniques described in Lahann, et al., "A Reversibly Switching Surface," *Science* 299:5605, pp. 371-374 (2003), which is incorporated by reference herein. These fluid-directing features may be selected, for example, to facilitate a flow pattern that optimizes an electrical property (e.g., global or local current, voltage, current density, amount or composition of electrochemically active fluid, or amount or composition of reaction products) of the device. For example, a flow pattern may be chosen that equalizes current flow transverse to the electrode-electrolyte interface by presenting a larger surface area of electrode fluid to the electrolyte as the fluid becomes depleted of charge carriers. In some embodiments, fluid-directing features may be responsive to pressure and/or applied fields, and may adjust flow rate, presented area of fluid, flow direction, or wetting behavior, for example by dynamically changing surface energy, shape, and/or temperature.

FIG. 2 is a schematic of an electrode for use with an electrochemical device. The electrode includes an active surface 130 which may be substantially smooth, or may have a shaped or textured surface. In the illustrated embodiment, the device includes a plurality of conduits 132, 134, 136, 138 through the thickness of the electrode (in the illustrated embodiment, perpendicular to the illustrated face of the electrode), which are connected by surface channels 140, 142 on the electrode surface. In use, cathodic fluids are flowed from a reservoir (not shown) up through conduits 132, along surface channels 140, down through conduits 136, and into the same or another reservoir (not shown). Anodic fluids are similarly flowed up through conduits 134, along surface channels 142, and down through conduits 138. In the illustrated embodiment, for each set of surface channels, the channels widen as flow proceeds along the surface, which may create a pressure drop to facilitate flow. In some embodiments, the conduits or surface channels may wet their respective fluids or retain fluids via surface tension. Channels or conduits may also be connected, either at the surface or within the electrode. The illustrated face of the electrode is placed in contact with an electrolyte (not shown) as described above. The electrolyte may be fluid, solid, or a combination such as a porous solid infiltrated with a fluid. When the electrolyte is placed in contact with the fluids in surface channels 140, 142, an ionic current from the cathode to the anode is produced in the electrolyte. In some embodiments, surface channels 140, 142 are small and/or closely spaced (e.g., on the order of millimeters or microns), allowing a high current density through the electrolyte and a high specific power output for a battery using the illustrated electrode. In some embodiments, the illustrated electrode and the electrolyte may be flexible. Electrodes and electrolyte may be stacked or arranged in other configurations to achieve a desired form factor (for instance, a "jellyroll" configuration of a rolled sheet of electrode and electrolyte, which may be flexible or rigid).

The illustrated electrode may be produced by micromachining, lithography, molding (including extrusion), printing, stamping, replica-printing, or other known processes for constructing MEMS and other microscale or nanoscale devices. Other electrode configurations that direct fluid according to a predetermined pattern may also be used—the arrangement illustrated in FIG. 2 is merely exemplary. In some such embodiments, two electrodes positioned on opposing surfaces of the electrolyte (like the configuration of FIG. 1) may be used.

FIG. 3 is a schematic of another electrode surface for an electrochemical device. Electrode plate 150 may be smooth or textured. The surface is treated to produce areas with differing wetting properties (e.g., hydrophilic, hydrophobic, oleophilic, or oleophobic surfaces). Surface treatment may be accomplished, for example, by binding different functional groups to different sites (for example, using soft lithography), by etching (e.g., to change physical properties or to expose a material overcoated with another material), by chemical or physical vapor deposition, by laser processing (e.g., by ablation or surface restructuring, such as by femtosecond laser pulses) by roughening or otherwise physically modifying the surfaces, or by a combination of these techniques.

In the illustrated embodiment, the surface is treated at areas 152 and 154 with two different surface treatments. Areas 152 are treated so that they will be wetted by a cathodic fluid, and areas 154 are treated so that they will be wetted by an anodic fluid. In one embodiment, a carrier fluid for a cathodic species is aqueous in nature, while a carrier fluid for an anodic species is nonaqueous, and areas 152 and 154 are each treated to be wetted by aqueous and nonaqueous species, respectively. In use, the fluids may be washed over the surface of electrode plate 150, and will selectively cling to their respective areas. The electrode may then be placed in contact with an electrolyte (not shown) to produce the electrochemical reaction. Contacts (not shown) placed at the surface treated areas (e.g., connected via the back of electrode plate 150) may extract electrical energy from the electrochemical reaction. In some embodiments, the cathodic and anodic fluids will have a greater affinity for the electrolyte than they will for one another, thereby reducing chances for cathodic and anodic fluids to make direct electrical contact. As fluids become depleted in regions 152 and 154, new fluids may be washed over the surface to replenish them, optionally after first wiping the surface clean of fluid. In some embodiments, this washing may be done at a temperature that prevents excessive reaction of the fluids during the washing process, either by slowing reaction kinetics or by placing at least one of the fluids in a nonreactive (e.g., solid) phase during a portion of the process. Alternatively, fluids may be placed more selectively upon their respective areas (e.g., via channels from the back of electrode plate 150), and are retained in position by the differing surface energies of the different regions of electrode plate 150. In another embodiment, two electrode plates are used, each with retaining areas for a single species of electrode fluid. In the illustrated embodiment, it will be noted that there are twice as many regions for anode fluids as for cathode fluids. In other embodiments, these proportions may be reversed or the proportions of areas may be equal (or any other appropriate ratio, taking into account the quantities, chemical activities, and availabilities of the electrode species).

In another embodiment, local surface energy regions 152, 154 may be placed directly on the surface of a solid electrolyte. The electrolyte may then be washed with the electrode fluids to deposit them in the appropriate regions. The regions of differing surface energy may all be placed on one common surface of the electrolyte, or they may be on opposing surfaces.

Figure 4:
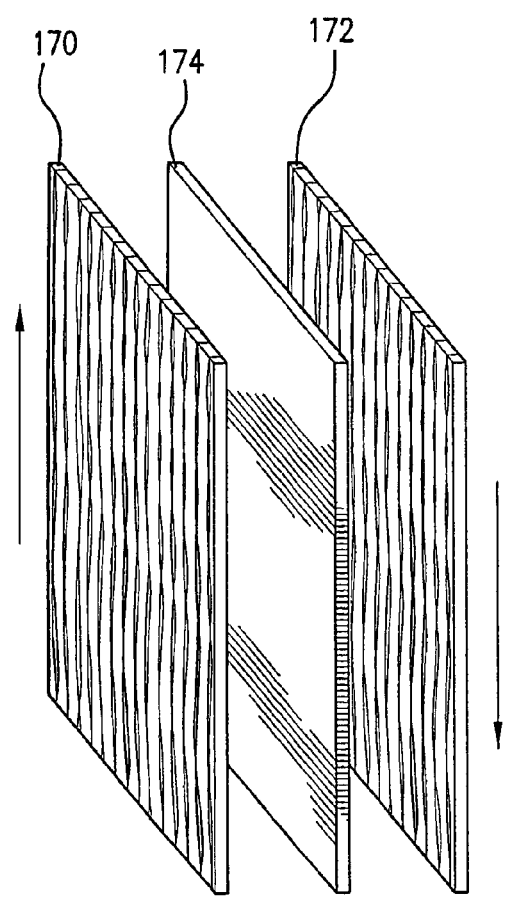
FIG. 4 is a schematic of another electrochemical device.

FIG. 4 is a schematic of another electrochemical device. Cathode 170 and anode 172 each include a sheet of substantially parallel fibers that may be infiltrated with an electrochemically active fluid as described above. These fibers are separated by electrolyte 174. In use, the fibers function to guide flow of electrochemically active fluid along the surface of the electrolyte as shown by the arrows. In the illustrated embodiment, the fibers are of substantially uniform thickness, but tapered fibers may also be used to present differing surface areas of fluid to the electrolyte, or the fibers may be curved to define a curved flow path. In some embodiments, the fibers may be affixed to one another or to the electrolyte 174.

In another embodiment, rather than parallel fibers, fluid may be guided along a known path by other structures such as particulates or a porous medium. In any of these cases, capillary flow may draw fluid through the fibers, particulates, or other medium.

In general, in order to extract or to store electrical energy in any of the previously described electrochemical devices, contacts will be used to connect the device to an electrical load or an electrical generator. These contacts may be placed at any convenient location in electrical contact with the electrode fluids. In cases where the fluids themselves are conductive, contacts may simply be immersed or otherwise placed in contact with the fluids. In some embodiments, the electrochemically active fluids may be nonconductive or have a relatively low conductivity. In these cases, if there is a support structure supporting the fluids, it may be convenient for the support structure to serve as an electrical connection.

Any of the electrochemical devices described herein may generate a certain amount of waste heat, and may be provided with a cooling system. In some embodiments, the flow of electrode or electrolyte fluids may provide cooling.

In some embodiments, electrochemical devices may further include circuitry or other mechanisms for monitoring depletion level of the various fluids of the electrodes or electrolyte. In some embodiments, these devices may monitor electrical output in order to infer depletion levels, or may directly measure chemical concentrations or activities. These monitored depletion levels may be used, for example, to determine remaining battery life, or to identify an economic value for depleted fluid (for example when recharging a battery by replacing depleted fluid with fresh fluid).

A wide variety of chemical reactions may be used in the electrochemical devices described herein. In principle, any pair of the half-reactions described in a standard electrode potential table may be used at the cathode and anode, although reactions that are substantially separated on the table are preferred for some embodiments as they will yield a higher device voltage. (An example table of standard electrode potentials is appended as Appendix A; however, reactions not listed in Appendix A may also be used in the devices described herein.) In some embodiments, reactants that are liquid at operating temperature (e.g., liquid metals and liquid metal alloys) may be preferred. Exemplary anode materials include lithium, sodium, mercury, tin, cesium, rubidium, potassium, and compounds containing any of these, while exemplary cathode materials include gallium, iron, mercury, tin, chlorine, and compounds containing any of these. Suitable electrolyte materials will generally include salts compatible with the chosen anode and cathode materials. Any of the above materials may include dissolved gases (e.g., oxygen), which may in some embodiments participate in the electrochemical reaction.

Various embodiments of electrochemical devices and methods have been described herein. In general, features that have been described in connection with one particular embodiment may be used in other embodiments, unless context dictates otherwise. For example, the electrodes described in connection with FIG. 3 may be employed in the devices described in connection with FIG. 1, or with any of the embodiments described herein. For the sake of brevity, descriptions of such features have not been repeated, but will be understood to be included in the different aspects and embodiments described herein.

It will be understood that, in general, terms used herein, and especially in the appended claims, are generally intended as "open" terms (e.g., the term "including" should be interpreted as "including but not limited to," the term "having" should be interpreted as "having at least," the term "includes" should be interpreted as "includes but is not limited to," etc.). It will be further understood that if a specific number of an introduced claim recitation is intended, such an intent will be explicitly recited in the claim, and in the absence of such recitation no such intent is present. For example, as an aid to understanding, the following appended claims may contain usage of introductory phrases such as "at least one" or "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "an electrode" should typically be interpreted to mean "at least one electrode"); the same holds true for the use of definite articles used to introduce claim recitations. In addition, even if a specific number of an introduced claim recitation is explicitly recited, it will be recognized that such recitation should typically be interpreted to mean at least the recited number (e.g., the bare recitation of "two fluid-directing structures," or "a plurality of fluid-directing structures," without other modifiers, typically means at least two fluid-directing structures). Furthermore, in those instances where a phrase such as "at least one of A, B, and C," "at least one of A, B, or C," or "an [item] selected from the group consisting of A, B, and C," is used, in general such a construction is intended to be disjunctive (e.g., any of these phrases would include but not be limited to systems that have A alone, B alone, C alone, A and B together, A and C together, B and C together, or A, B, and C together, and may further include more than one of A, B, or C, such as $A_1$, $A_2$, and C together, A, $B_1$, $B_2$, $C_1$, and $C_2$ together, or $B_1$ and $B_2$ together). It will be further understood that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

APPENDIX A

| Half-reaction | E° (V) |
|---|---|
| $\frac{3}{2} N_2(g) + H^+ + e^- \rightleftharpoons HN_3(aq)$ | −3.09 |
| $Li^+ + e^- \rightleftharpoons Li(s)$ | −3.0401 |
| $N_2(g) + 4H_2O + 2e^- \rightleftharpoons 2NH_2OH(aq) + 2OH^-$ | −3.04 |
| $Cs^+ + e^- \rightleftharpoons Cs(s)$ | −3.026 |
| $Rb^+ + e^- \rightleftharpoons Rb(s)$ | −2.98 |
| $K^+ + e^- \rightleftharpoons K(s)$ | −2.931 |
| $Ba^{2+} + 2e^- \rightleftharpoons Ba(s)$ | −2.912 |
| $La(OH)_3(s) + 3e^- \rightleftharpoons La(s) + 3OH^-$ | −2.90 |
| $Sr^{2+} + 2e^- \rightleftharpoons Sr(s)$ | −2.899 |
| $Ca^{2+} + 2e^- \rightleftharpoons Ca(s)$ | −2.868 |
| $Eu^{2+} + 2e^- \rightleftharpoons Eu(s)$ | −2.812 |
| $Ra^{2+} + 2e^- \rightleftharpoons Ra(s)$ | −2.8 |
| $Na^+ + e^- \rightleftharpoons Na(s)$ | −2.71 |
| $La^{3+} + 3e^- \rightleftharpoons La(s)$ | −2.379 |
| $Y^{3+} + 3e^- \rightleftharpoons Y(s)$ | −2.372 |
| $Mg^{2+} + 2e^- \rightleftharpoons Mg(s)$ | −2.372 |
| $ZrO(OH)_2(s) + H_2O + 4e^- \rightleftharpoons Zr(s) + 4OH^-$ | −2.36 |
| $Al(OH)_4^- + 3e^- \rightleftharpoons Al(s) + 4OH^-$ | −2.33 |
| $Al(OH)_3(s) + 3e^- \rightleftharpoons Al(s) + 3OH^-$ | −2.31 |
| $H_2(g) + 2e^- \rightleftharpoons 2H^-$ | −2.25 |
| $Ac^{3+} + 3e^- \rightleftharpoons Ac(s)$ | −2.20 |
| $Be^{2+} + 2e^- \rightleftharpoons Be(s)$ | −1.85 |
| $U^{3+} + 3e^- \rightleftharpoons U(s)$ | −1.66 |
| $Al^{3+} + 3e^- \rightleftharpoons Al(s)$ | −1.66 |
| $Ti^{2+} + 2e^- \rightleftharpoons Ti(s)$ | −1.63 |
| $ZrO_2(s) + 4H^+ + 4e^- \rightleftharpoons Zr(s) + 2H_2O$ | −1.553 |
| $Zr^{4+} + 4e^- \rightleftharpoons Zr(s)$ | −1.45 |
| $TiO(s) + 2H^+ + 2e^- \rightleftharpoons Ti(s) + H_2O$ | −1.31 |
| $Ti_2O_3(s) + 2H^+ + 2e^- \rightleftharpoons 2TiO(s) + H_2O$ | −1.23 |
| $Ti^{3+} + 3e^- \rightleftharpoons Ti(s)$ | −1.21 |
| $Mn^{2+} + 2e^- \rightleftharpoons Mn(s)$ | −1.185 |
| $Te(s) + 2e^- \rightleftharpoons Te^{2-}$ | −1.143 |
| $V^{2+} + 2e^- \rightleftharpoons V(s)$ | −1.13 |
| $Nb^{3+} + 3e^- \rightleftharpoons Nb(s)$ | −1.099 |
| $Sn(s) + 4H^+ + 4e^- \rightleftharpoons SnH_4(g)$ | −1.07 |
| $SiO_2(s) + 4H^+ + 4e^- \rightleftharpoons Si(s) + 2H_2O$ | −0.91 |
| $B(OH)_3(aq) + 3H^+ + 3e^- \rightleftharpoons B(s) + 3H_2O$ | −0.89 |
| $TiO^{2+} + 2H^+ + 4e^- \rightleftharpoons Ti(s) + H_2O$ | −0.86 |
| $Bi(s) + 3H^+ + 3e^- \rightleftharpoons BiH_3$ | −0.8 |
| $H_2O + 2e^- \rightleftharpoons H_2(g) + 2OH^-$ | −0.8277 |
| $Zn^{2+} + 2e^- \rightleftharpoons Zn(Hg)$ | −0.7628 |
| $Zn^{2+} + 2e^- \rightleftharpoons Zn(s)$ | −0.7618 |
| $Ta_2O_5(s) + 10H^+ + 10e^- \rightleftharpoons 2Ta(s) + 5H_2O$ | −0.75 |
| $Cr^{3+} + 3e^- \rightleftharpoons Cr(s)$ | −0.74 |
| $[Au(CN)_2]^- + e^- \rightleftharpoons Au(s) + 2CN^-$ | −0.60 |
| $Ta^{3+} + 3e^- \rightleftharpoons Ta(s)$ | −0.6 |
| $PbO(s) + H_2O + 2e^- \rightleftharpoons Pb(s) + 2OH^-$ | −0.58 |
| $2TiO_2(s) + 2H^+ + 2e^- \rightleftharpoons Ti_2O_3(s) + H_2O$ | −0.56 |
| $Ga^{3+} + 3e^- \rightleftharpoons Ga(s)$ | −0.53 |
| $AgI(s) + e^- \rightleftharpoons Ag(s) + I^-$ | −0.15224 |
| $U^{4+} + e^- \rightleftharpoons U^{3+}$ | −0.52 |
| $H_3PO_2(aq) + H^+ + e^- \rightleftharpoons P(white) + 2H_2O$ | −0.508 |
| $H_3PO_3(aq) + 2H^+ + 2e^- \rightleftharpoons H_3PO_2(aq) + H_2O$ | −0.499 |
| $H_3PO_3(aq) + 3H^+ + 3e^- \rightleftharpoons P(red) + 3H_2O$ | −0.454 |
| $Fe^{2+} + 2e^- \rightleftharpoons Fe(s)$ | −0.44 |
| $2CO_2(g) + 2H^+ + 2e^- \rightleftharpoons HOOCCOOH(aq)$ | −0.43 |
| $Cr^{3+} + e^- \rightleftharpoons Cr^{2+}$ | −0.42 |
| $Cd^{2+} + 2e^- \rightleftharpoons Cd(s)$ | −0.40 |
| $GeO_2(s) + 2H^+ + 2e^- \rightleftharpoons GeO(s) + H_2O$ | −0.37 |
| $Cu_2O(s) + H_2O + 2e^- \rightleftharpoons 2Cu(s) + 2OH^+$ | −0.360 |
| $PbSO_4(s) + 2e^- \rightleftharpoons Pb(s) + SO_4^{2-}$ | −0.3588 |
| $PbSO_4(s) + 2e^- \rightleftharpoons Pb(Hg) + SO_4^{2-}$ | −0.3505 |
| $Eu^{3+} + e^- \rightleftharpoons Eu^{2+}$ | −0.35 |
| $In^{3+} + 3e^- \rightleftharpoons In(s)$ | −0.34 |
| $Tl^+ + e^- \rightleftharpoons Tl(s)$ | −0.34 |
| $Ge(s) + 4H^+ + 4e^- \rightleftharpoons GeH_4(g)$ | −0.29 |
| $Co^{2+} + 2e^- \rightleftharpoons Co(s)$ | −0.28 |
| $H_3PO_4(aq) + 2H^+ + 2e^- \rightleftharpoons H_3PO_3(aq) + H_2O$ | −0.276 |
| $V^{3+} + e^- \rightleftharpoons V^{2+}$ | −0.26 |
| $Ni^{2+} + 2e^- \rightleftharpoons Ni(s)$ | −0.25 |
| $As(s) + 3H^+ + 3e^- \rightleftharpoons AsH_3(g)$ | −0.23 |
| $MoO_2(s) + 4H^+ + 4e^- \rightleftharpoons Mo(s) + 2H_2O$ | −0.15 |
| $Si(s) + 4H^+ + 4e^- \rightleftharpoons SiH_4(g)$ | −0.14 |
| $Sn^{2+} + 2e^- \rightleftharpoons Sn(s)$ | −0.13 |
| $O_2(g) + H^+ + e^- \rightleftharpoons HO_2 \cdot (aq)$ | −0.13 |
| $Pb^{2+} + 2e^- \rightleftharpoons Pb(s)$ | −0.13 |
| $WO_2(s) + 4H^+ + 4e^- \rightleftharpoons W(s) + 2H_2O$ | −0.12 |
| $P(red) + 3H^+ + 3e^- \rightleftharpoons PH_3(g)$ | −0.111 |
| $CO_2(g) + 2H^+ + 2e^- \rightleftharpoons HCOOH(aq)$ | −0.11 |
| $Se(s) + 2H^+ + 2e^- \rightleftharpoons H_2Se(g)$ | −0.11 |
| $CO_2(g) + 2H^+ + 2e^- \rightleftharpoons CO(g) + H_2O$ | −0.11 |
| $SnO(s) + 2H^+ + 2e^- \rightleftharpoons Sn(s) + H_2O$ | −0.10 |
| $SnO_2(s) + 2H^+ + 2e^- \rightleftharpoons SnO(s) + H_2O$ | −0.09 |
| $WO_3(aq) + 6H^+ + 6e^- \rightleftharpoons W(s) + 3H_2O$ | −0.09 |
| $P(white) + 3H^+ + 3e^- \rightleftharpoons PH_3(g)$ | −0.063 |
| $HCOOH(aq) + 2H^+ + 2e^- \rightleftharpoons HCHO(aq) + H_2O$ | −0.03 |
| $2H^+ + 2e^- \rightleftharpoons H_2(g)$ | 0.0000 |
| $AgBr(s) + e^- \rightleftharpoons Ag(s) + Br^-$ | +0.07133 |
| $S_4O_6^{2-} + 2e^- \rightleftharpoons 2S_2O_3^{2-}$ | +0.08 |
| $Fe_3O_4(s) + 8H^+ + 8e^- \rightleftharpoons 3Fe(s) + 4H_2O$ | +0.085 |
| $N_2(g) + 2H_2O + 6H^+ + 6e^- \rightleftharpoons 2NH_4OH(aq)$ | +0.092 |
| $HgO(s) + H_2O + 2e^- \rightleftharpoons Hg(l) + 2OH^-$ | +0.0977 |
| $Cu(NH_3)_4^{2+} + e^- \rightleftharpoons Cu(NH_3)_2^+ + 2NH_3$ | +0.10 |
| $Ru(NH_3)_6^{3+} + e^- \rightleftharpoons Ru(NH_3)_6^{2+}$ | +0.10 |
| $N_2H_4(aq) + 4H_2O + 2e^- \rightleftharpoons 2NH_4^+ + 4OH^-$ | +0.11 |
| $H_2MoO_4(aq) + 6H^+ + 6e^- \rightleftharpoons Mo(s) + 4H_2O$ | +0.11 |
| $Ge^{4+} + 4e^- \rightleftharpoons Ge(s)$ | +0.12 |
| $C(s) + 4H^+ + 4e^- \rightleftharpoons CH_4(g)$ | +0.13 |
| $HCHO(aq) + 2H^+ + 2e^- \rightleftharpoons CH_3OH(aq)$ | +0.13 |
| $S(s) + 2H^+ + 2e^- \rightleftharpoons H_2S(g)$ | +0.14 |
| $Sn^{4+} + 2e^- \rightleftharpoons Sn^{2+}$ | +0.15 |
| $Cu^{2+} + e^- \rightleftharpoons Cu^+$ | +0.159 |
| $HSO_4^- + 3H^+ + 2e^- \rightleftharpoons SO_2(aq) + 2H_2O$ | +0.16 |
| $UO_2^{2+} + e^- \rightleftharpoons UO_2^+$ | +0.163 |
| $SO_4^{2-} + 4H^+ + 2e^- \rightleftharpoons SO_2(aq) + 2H_2O$ | +0.17 |
| $TiO^{2+} + 2H^+ + e^- \rightleftharpoons Ti^{3+} + H_2O$ | +0.19 |
| $Bi^{3+} + 2e^- \rightleftharpoons Bi^+$ | +0.2 |
| $SbO^+ + 2H^+ + 3e^- \rightleftharpoons Sb(s) + H_2O$ | +0.20 |
| $AgCl(s) + e^- \rightleftharpoons Ag(s) + Cl^-$ | +0.22233 |
| $H_3AsO_3(aq) + 3H^+ + 3e^- \rightleftharpoons As(s) + 3H_2O$ | +0.24 |
| $GeO(s) + 2H^+ + 2e^- \rightleftharpoons Ge(s) + H_2O$ | +0.26 |
| $UO_2^+ + 4H^+ + e^- \rightleftharpoons U^{4+} + 2H_2O$ | +0.273 |
| $Re^{3+} + 3e^- \rightleftharpoons Re(s)$ | +0.300 |
| $Bi^{3+} + 3e^- \rightleftharpoons Bi(s)$ | +0.32 |
| $VO^{2+} + 2H^+ + e^- \rightleftharpoons V^{3+} + H_2O$ | +0.34 |
| $Cu^{2+} + 2e^- \rightleftharpoons Cu(s)$ | +0.340 |
| $[Fe(CN)_6]^{3-} + e^- \rightleftharpoons [Fe(CN)_6]^{4-}$ | +0.36 |
| $O_2(g) + 2H_2O + 4e^- \rightleftharpoons 4OH^-(aq)$ | +0.40 |
| $H_2MoO_4 + 6H^+ + 3e^- \rightleftharpoons Mo^{3+} + 2H_2O$ | +0.43 |
| $Bi^+ + e^- \rightleftharpoons Bi(s)$ | +0.50 |
| $CH_3OH(aq) + 2H^+ + 2e^- \rightleftharpoons CH_4(g) + H_2O$ | +0.50 |
| $SO_2(aq) + 4H^+ + 4e^- \rightleftharpoons S(s) + 2H_2O$ | +0.50 |
| $Cu^+ + e^- \rightleftharpoons Cu(s)$ | +0.520 |
| $CO(g) + 2H^+ + 2e^- \rightleftharpoons C(s) + H_2O$ | +0.52 |
| $I_2(s) + 2e^- \rightleftharpoons 2I^-$ | +0.54 |
| $I_3^- + 2e^- \rightleftharpoons 3I^-$ | +0.53 |
| $[AuI_4]^- + 3e^- \rightleftharpoons Au(s) + 4I^-$ | +0.56 |
| $H_3AsO_4(aq) + 2H^+ + 2e^- \rightleftharpoons H_3AsO_3(aq) + H_2O$ | +0.56 |
| $[AuI_2]^- + e^- \rightleftharpoons Au(s) + 2I^-$ | +0.58 |
| $MnO_4^- + 2H_2O + 3e^- \rightleftharpoons MnO_2(s) + 4OH^-$ | +0.59 |
| $S_2O_3^{2-} + 6H^+ + 4e^- \rightleftharpoons 2S(s) + 3H_2O$ | +0.60 |
| $H_2MoO_4(aq) + 2H^+ + 2e^- \rightleftharpoons MoO_2(s) + 2H_2O$ | +0.65 |
| $O_2(g) + 2H^+ + 2e^- \rightleftharpoons H_2O_2(aq)$ | +0.70 |
| $Tl^{3+} + 3e^- \rightleftharpoons Tl(s)$ | +0.72 |
| $PtCl_6^{2-} + 2e^- \rightleftharpoons PtCl_4^{2-} + 2Cl^-$ | +0.726 |
| $H_2SeO_3(aq) + 4H^+ + 4e^- \rightleftharpoons Se(s) + 3H_2O$ | +0.74 |
| $PtCl_4^{2-} + 2e^- \rightleftharpoons Pt(s) + 4Cl^-$ | +0.758 |
| $Fe^{3+} + e^- \rightleftharpoons Fe^{2+}$ | +0.77 |
| $Ag^+ + e^- \rightleftharpoons Ag(s)$ | +0.7996 |
| $Hg_2^{2+} + 2e^- \rightleftharpoons 2Hg(l)$ | +0.80 |
| $NO_3^-(aq) + 2H^+ + e^- \rightleftharpoons NO_2(g) + H_2O$ | +0.80 |
| $[AuBr_4]^- + 3e^- \rightleftharpoons Au(s) + 4Br^-$ | +0.85 |
| $Hg^{2+} + 2e^- \rightleftharpoons Hg(l)$ | +0.85 |
| $MnO_4^- + H^+ + e^- \rightleftharpoons HMnO_4^-$ | +0.90 |
| $2Hg^{2+} + 2e^- \rightleftharpoons Hg_2^{2+}$ | +0.91 |
| $Pd^{2+} + 2e^- \rightleftharpoons Pd(s)$ | +0.915 |
| $[AuCl_4]^- + 3e^- \rightleftharpoons Au(s) + 4Cl^-$ | +0.93 |
| $MnO_2(s) + 4H^+ + e^- \rightleftharpoons Mn^{3+} + 2H_2O$ | +0.95 |
| $[AuBr_2]^- + e^- \rightleftharpoons Au(s) + 2Br^-$ | +0.96 |
| $Br_2(l) + 2e^- \rightleftharpoons 2Br^-$ | +1.066 |
| $Br_2(aq) + 2e^- \rightleftharpoons 2Br^-$ | +1.0873 |
| $IO_3^- + 5H^+ + 4e^- \rightleftharpoons HIO(aq) + 2H_2O$ | +1.13 |
| $[AuCl_2]^- + e^- \rightleftharpoons Au(s) + 2Cl^-$ | +1.15 |
| $HSeO_4^- + 3H^+ + 2e^- \rightleftharpoons H_2SeO_3(aq) + H_2O$ | +1.15 |
| $Ag_2O(s) + 2H^+ + 2e^- \rightleftharpoons 2Ag(s) + H_2O$ | +1.17 |
| $ClO_3^- + 2H^+ + e^- \rightleftharpoons ClO_2(g) + H_2O$ | +1.18 |

APPENDIX A-continued

| Half-reaction | E° (V) |
|---|---|
| $Pt^{2+} + 2e^- \rightleftarrows Pt(s)$ | +1.188 |
| $ClO_2(g) + H^+ + e^- \rightleftarrows HClO_2(aq)$ | +1.19 |
| $2IO_3^- + 12H^+ + 10e^- \rightleftarrows I_2(s) + 6H_2O$ | +1.20 |
| $ClO_4^- + 2H^+ + 2e^- \rightleftarrows ClO_3^- + H_2O$ | +1.20 |
| $O_2(g) + 4H^+ + 4e^- \rightleftarrows 2H_2O$ | +1.23 |
| $MnO_2(s) + 4H^+ + 2e^- \rightleftarrows Mn^{2+} + 2H_2O$ | +1.23 |
| $Tl^{3+} + 2e^- \rightleftarrows Tl^+$ | +1.25 |
| $Cl_2(g) + 2e^- \rightleftarrows 2Cl^-$ | +1.36 |
| $Cr_2O_7^{2-} + 14H^+ + 6e^- \rightleftarrows 2Cr^{3+} + 7H_2O$ | +1.33 |
| $CoO_2(s) + 4H^+ + e^- \rightleftarrows Co^{3+} + 2H_2O$ | +1.42 |
| $2NH_3OH^+ + H^+ + 2e^- \rightleftarrows N_2H_5^+ + 2H_2O$ | +1.42 |
| $2HIO(aq) + 2H^+ + 2e^- \rightleftarrows I_2(s) + 2H_2O$ | +1.44 |
| $Ce^{4+} + e^- \rightleftarrows Ce^{3+}$ | +1.44 |
| $BrO_3^- + 5H^+ + 4e^- \rightleftarrows HBrO(aq) + 2H_2O$ | +1.45 |
| $\beta\text{-}PbO_2(s) + 4H^+ + 2e^- \rightleftarrows Pb^{2+} + 2H_2O$ | +1.460 |
| $\alpha\text{-}PbO_2(s) + 4H^+ + 2e^- \rightleftarrows Pb^{2+} + 2H_2O$ | +1.468 |
| $2BrO_3^- + 12H^+ + 10e^- \rightleftarrows Br_2(l) + 6H_2O$ | +1.48 |
| $2ClO_3^- + 12H^+ + 10e^- \rightleftarrows Cl_2(g) + 6H_2O$ | +1.49 |
| $MnO_4^- + 8H^+ + 5e^- \rightleftarrows Mn^{2+} + 4H_2O$ | +1.51 |
| $HO_2 \cdot + H^+ + e^- \rightleftarrows H_2O_2(aq)$ | +1.51 |
| $Au^{3+} + 3e^- \rightleftarrows Au(s)$ | +1.52 |
| $NiO_2(s) + 4H^+ + 2e^- \rightleftarrows Ni^{2+} + 2OH^-$ | +1.59 |
| $2HClO(aq) + 2H^+ + 2e^- \rightleftarrows Cl_2(g) + 2H_2O$ | +1.63 |
| $Ag_2O_3(s) + 6H^+ + 4e^- \rightleftarrows 2Ag^+ + 3H_2O$ | +1.67 |
| $HClO_2(aq) + 2H^+ + 2e^- \rightleftarrows HClO(aq) + H_2O$ | +1.67 |
| $Pb^{4+} + 2e^- \rightleftarrows Pb^{2+}$ | +1.69 |
| $MnO_4^- + 4H^+ + 3e^- \rightleftarrows MnO_2(s) + 2H_2O$ | +1.70 |
| $H_2O_2(aq) + 2H^+ + 2e^- \rightleftarrows 2H_2O$ | +1.78 |
| $AgO(s) + 2H^+ + e^- \rightleftarrows Ag^+ + H_2O$ | +1.77 |
| $Co^{3+} + e^- \rightleftarrows Co^{2+}$ | +1.82 |
| $Au^+ + e^- \rightleftarrows Au(s)$ | +1.83 |
| $BrO_4^- + 2H^+ + 2e^- \rightleftarrows BrO_3^- + H_2O$ | +1.85 |
| $Ag^{2+} + e^- \rightleftarrows Ag^+$ | +1.98 |
| $S_2O_8^{2-} + 2e^- \rightleftarrows 2SO_4^{2-}$ | +2.010 |
| $O_3(g) + 2H^+ + 2e^- \rightleftarrows O_2(g) + H_2O$ | +2.075 |
| $HMnO_4^- + 3H^+ + 2e^- \rightleftarrows MnO_2(s) + 2H_2O$ | +2.09 |
| $F_2(g) + 2e^- \rightleftarrows 2F^-$ | +2.87 |
| $F_2(g) + 2H^+ + 2e^- \rightleftarrows 2HF(aq)$ | +3.05 |

What is claimed is:

1. An electrochemical device, comprising:
   two electrodes including a cathode and an anode; and
   an electrolyte that is separate and distinct from the two electrodes and is arranged to conduct an ionic current from a first electrolyte surface in contact with one of the electrodes to a second electrolyte surface in contact with the other electrode,
   wherein at least one of the electrodes includes
      an electrochemically active fluid layer that is disposed over a micropatterned support and has a surface in contact with the electrolyte; and
      the micropatterned support including a fluid-directing structure configured to retain the electrochemically active fluid at a predetermined location during operation of the electrochemical device to generate an electrical potential between the electrodes,
   and wherein the electrolyte includes a reaction product of at least a portion of the cathode with at least a portion of the anode.

2. An electrode for a battery, comprising:
   an electrochemically active fluid layer that is disposed over and clings to a micropatterned solid support by a surface energy effect, the electrochemically active fluid layer being configured to contact an electrolyte that is separate and distinct from the electrode, and the micropatterned solid support including a fluid-directing structure configured to retain electrochemically active fluid at a predetermined location during operation of the electrode to generate an electrical potential, wherein the electrolyte includes a reaction product of at least a portion of a cathode with at least a portion of an anode.

3. The electrochemical device of claim 1, wherein the micropatterned support includes fluid-directing structures configured to retain a plurality of fluids, each at a predetermined location.

4. The electrochemical device of claim 1, wherein the micropatterned support includes a first fluid-directing structure configured to retain an electrochemically active fluid of the anode, and a second fluid-directing structure configured to retain an electrochemically active fluid of the cathode.

5. The electrochemical device of claim 1, wherein the micropatterned support is configured to spatially vary the contact between the electrochemically active fluid layer and the electrolyte.

6. The electrochemical device of claim 1, wherein the micropatterned support includes a fluid channel.

7. The electrochemical device of claim 6, wherein the fluid channel has a surface that wets the electrochemically active fluid.

8. The electrochemical device of claim 6, wherein the fluid channel is configured to retain the electrochemically active fluid by surface tension.

9. The electrochemical device of claim 6, wherein a dimension of the fluid channel varies along its length.

10. The electrochemical device of claim 1, wherein the micropatterned support includes a plurality of fluid channels, and wherein at least two of the fluid channels are connected.

11. The electrochemical device of claim 1, wherein the micropatterned support includes a first region and a second region, the first and second regions having different wetting behavior with the electrochemically active fluid layer.

12. The electrochemical device of claim 1, wherein the electrochemical device is configured to dynamically change a property of the fluid-directing structure.

13. The electrochemical device of claim 12, wherein the electrochemical device is configured to dynamically change the property of the fluid-directing structure in response to a property of the device.

14. The electrochemical device of claim 1, wherein the electrolyte is further arranged to conduct an ionic current from the second electrolyte surface to the first electrolyte surface.

15. The electrochemical device of claim 1, wherein the electrolyte includes a solid surface impervious to the electrochemically active fluid.

16. The electrochemical device of claim 1, wherein the electrolyte includes a fluid-directing structure configured to direct fluid flow of the electrochemically active fluid layer.

17. The electrochemical device of claim 1, wherein the electrolyte includes an ion-transport fluid through which an ion can move to produce the ionic current.

18. The electrochemical device of claim 17, wherein the electrolyte further includes a solid structure.

19. The electrochemical device of claim 18, wherein the solid structure includes a porous structure infiltrated by the ion-transport fluid.

20. The electrochemical device of claim 17, wherein the cathode and the anode each include an electrochemically active fluid layer, and wherein the ion-transport fluid is in contact with the respective electrochemically active fluid layer at each of the two electrodes.

21. The electrochemical device of claim 17, wherein the ion-transport fluid is immiscible with the electrochemically active fluid.

22. The electrochemical device of claim 17, wherein the ion-transport fluid is connected to an external reservoir.

23. The electrochemical device of claim 1, wherein the electrochemically active fluid layer includes a fluid selected from the group consisting of a liquid, a paste, a gel, an emulsion, and a non-Non-Newtonian fluid.

24. The electrochemical device of claim 1, wherein the electrochemically active fluid layer is an ionic conductor.

25. The electrochemical device of claim 1, wherein the electrochemically active fluid layer includes a carrier fluid that is not electrochemically active.

26. The electrochemical device of claim 1, wherein the electrochemically active fluid layer wets the electrolyte.

27. The electrochemical device of claim 1, wherein the electrochemically active fluid layer clings to the electrolyte.

28. The electrochemical device of claim 1, wherein the anode includes at least one element selected from the group consisting of lithium, sodium, mercury, tin, cesium, rubidium, and potassium.

29. The electrochemical device of claim 1, wherein the cathode includes at least one element selected from the group consisting of gallium, iron, mercury, tin, sulfur, and chlorine.

30. The electrochemical device of claim 1, wherein the electrolyte includes at least one material selected from the group consisting of perchlorate, ether, graphene, polyimide, succinonitrile, polyacrylonitrile, polyethylene oxide, polyethylene glycol, ethylene carbonate, beta-alumina, and an ion-conducting glass.

31. The electrochemical device of claim 1, wherein the fluid layer includes a liquid metal.

32. The electrochemical device of claim 1, wherein the electrochemically active fluid layer is connected to an external reservoir.

33. The electrochemical device of claim 1, wherein the fluid layer is configured to transport heat energy away from the battery.

* * * * *